(12) United States Patent
Brandstetter et al.

(10) Patent No.: US 12,356,086 B2
(45) Date of Patent: Jul. 8, 2025

(54) SYSTEM FOR MONITORING THE SURROUNDINGS OF A MOTOR VEHICLE

(71) Applicant: ZKW Group GmbH, Wieselburg (AT)

(72) Inventors: Martin Brandstetter, Ybbs (AT); Johann Altmann, Gmünd (AT); Martin Sporn, Melk (AT); Harald Bechmann, Wieselburg (AT); Ingeborg Bednar, Vienna (AT); Christian Jackl, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 115 days.

(21) Appl. No.: 17/777,503

(22) PCT Filed: Dec. 7, 2020

(86) PCT No.: PCT/EP2020/084884
§ 371 (c)(1),
(2) Date: May 17, 2022

(87) PCT Pub. No.: WO2021/116019
PCT Pub. Date: Jun. 17, 2021

(65) Prior Publication Data
US 2022/0417448 A1   Dec. 29, 2022

(30) Foreign Application Priority Data

Dec. 9, 2019 (EP) .................................. 19214486

(51) Int. Cl.
*H04N 23/90* (2023.01)
*B60Q 1/00* (2006.01)
(Continued)

(52) U.S. Cl.
CPC .......... *H04N 23/90* (2023.01); *B60Q 1/0023* (2013.01); *G01S 13/867* (2013.01); *G01S 13/89* (2013.01);
(Continued)

(58) Field of Classification Search
None
See application file for complete search history.

(56) References Cited

U.S. PATENT DOCUMENTS 11,048,898 B2 *   6/2021   Suman ............... G06K 7/10732
2002/0118282 A1 *   8/2002   Nakamura ............. H04N 7/183
348/148

(Continued)

OTHER PUBLICATIONS

International Search Report for PCT/EP2020/084884, dated Dec. 22, 2020 (14 pages).

(Continued)

*Primary Examiner* — Hung Q Dang
(74) *Attorney, Agent, or Firm* — Eversheds Sutherland (US) LLP

(57) ABSTRACT

The invention relates to a system (1) for monitoring the surroundings of a motor vehicle (100), in particular an autonomous or semi-autonomous motor vehicle, wherein the system (1) includes at least one optical image capturing device (2) as well as further a lighting device (3, 4), wherein the optical image capturing device (2) is arranged for capturing an area of coverage (E1) of the surroundings, and wherein the area of coverage (E1) can be illuminated at least partially, preferably completely, by the lighting device (3, 4), and wherein the lighting device (3, 4) is arranged for generating a motor vehicle light distribution or part of a motor vehicle light distribution. The system (1) includes at least one optical additional image capturing device (5), which is arranged to capture a so-called additional area of coverage (E2), and wherein the system (1) further includes an additional lighting device (6), which is arranged to illuminate at least partially, preferably completely, the additional area of coverage (E2), also called the second area of coverage.

24 Claims, 2 Drawing Sheets

Figure 1:
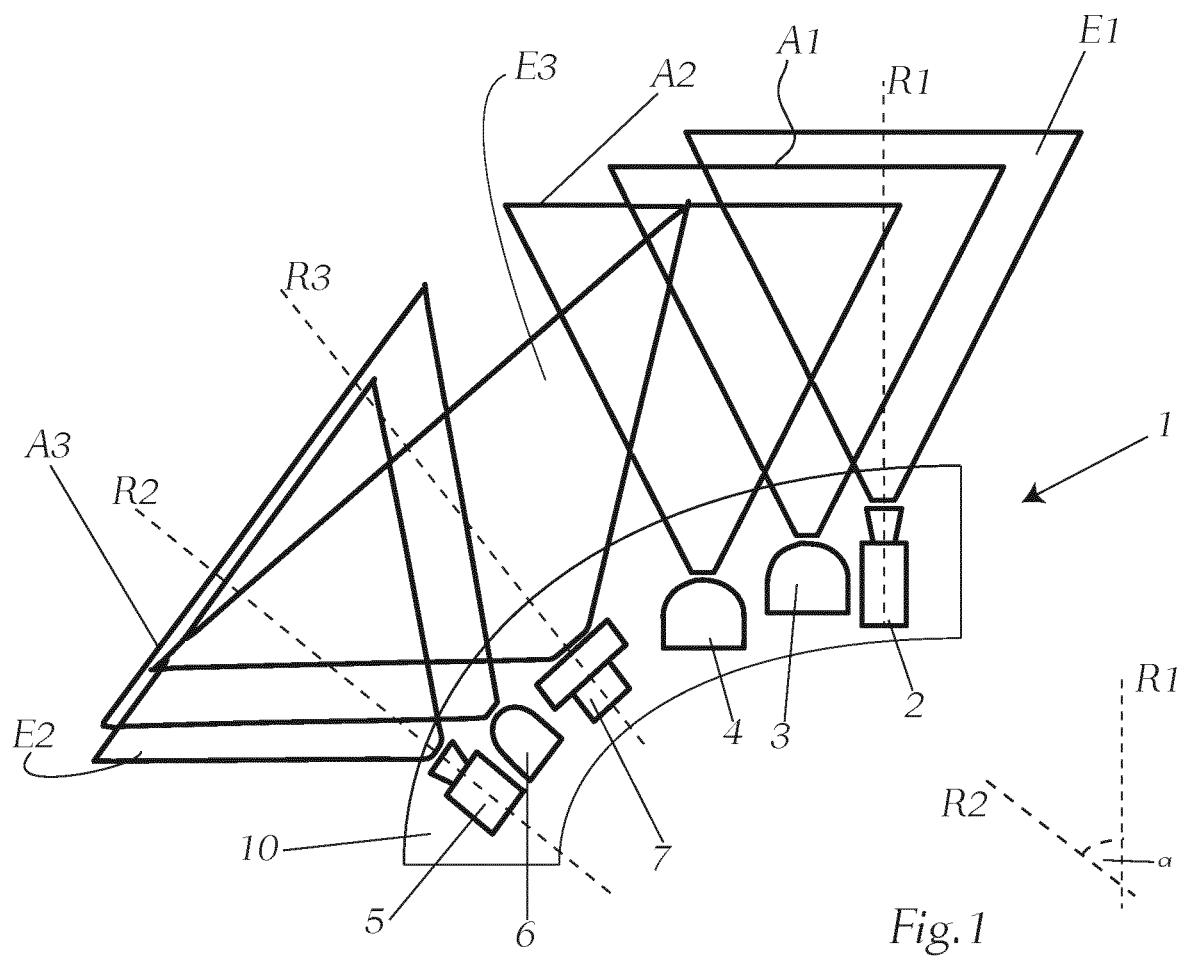

(51) Int. Cl.
  *B60Q 1/14* (2006.01)
  *B60Q 1/24* (2006.01)
  *B60W 60/00* (2020.01)
  *G01S 13/86* (2006.01)
  *G01S 13/89* (2006.01)
  *G01S 13/931* (2020.01)
  *G01S 17/86* (2020.01)
  *H04N 23/56* (2023.01)
  *G01S 17/89* (2020.01)
  *G01S 17/931* (2020.01)

(52) U.S. Cl.
  CPC ............ *G01S 13/931* (2013.01); *G01S 17/86* (2020.01); *H04N 23/56* (2023.01); *B60Q 1/1415* (2013.01); *B60W 60/001* (2020.02); *B60W 2420/403* (2013.01); *B60W 2420/408* (2024.01); *G01S 17/89* (2013.01); *G01S 17/931* (2020.01)

(56) References Cited

U.S. PATENT DOCUMENTS

| | | | |
|---|---|---|---|
| 2010/0194884 A1* | 8/2010 | Plaster | B60R 25/305 |
| | | | 348/148 |
| 2012/0229645 A1 | 9/2012 | Masahiro | |
| 2014/0043483 A1* | 2/2014 | Schuder | H04N 7/18 |
| | | | 348/148 |
| 2015/0042225 A1* | 2/2015 | Fukayama | B60Q 1/143 |
| | | | 315/82 |
| 2018/0339645 A1* | 11/2018 | Ekkizogloy | F21S 41/00 |
| 2019/0070997 A1* | 3/2019 | Mouri | F21S 41/143 |
| 2019/0275923 A1 | 9/2019 | Yoshiaki et al. | |
| 2021/0394724 A1* | 12/2021 | Kinsler | G01S 7/412 |
| 2024/0294115 A1* | 9/2024 | Komatsu | B60R 1/25 |

OTHER PUBLICATIONS

Search Report for European Patent Application No. 19214486.3 dated Jun. 18, 2020 (8 pages).

* cited by examiner

SYSTEM FOR MONITORING THE SURROUNDINGS OF A MOTOR VEHICLE

The invention relates to a system for monitoring the surroundings of a motor vehicle, in particular an autonomous or semi-autonomous motor vehicle, wherein the system includes at least one optical image capturing device as well as further a lighting device, wherein the optical image capturing device is arranged for capturing an area of coverage of the surroundings, and wherein the area of coverage can be illuminated at least partially, preferably completely, by the lighting device, and wherein the lighting device is arranged for generating a motor vehicle light distribution or part of a motor vehicle light distribution.

Further, the invention relates to a motor vehicle headlight for a motor vehicle, in particular an autonomous or semi-autonomous motor vehicle, wherein the motor vehicle headlight includes such a system.

In a motor vehicle such as a car image capturing units are nowadays provided, by means of which the surroundings of a motor vehicle, for example the area in front of the motor vehicle viewed in driving direction, can be monitored. The image capturing unit may be an object detection unit and/or a pattern detection unit, or one or more units are connected to the image capturing unit. This allows e.g. persons, and/or preceding vehicles and/or oncoming vehicles and/or road markings and/or traffic signs etc. to be detected.

This detected information may for example be used for controlling or partly controlling a motor vehicle, in particular an autonomous or semi-autonomous motor vehicle, and/or an automatic light distribution control of one headlight or the headlights of the motor vehicle may be arranged.

Typically these image capturing devices are cameras, and in most cases the one or more image capturing devices are facing forward, i.e. approximately in direction of travel or in direction of travel. During the day the field of vision of the image capturing device(s) is well lit by the ambient light. At night the area of coverage of forward facing image capturing devices is lit by the light emitted from the one vehicle headlight or the vehicle headlights (e.g. by light emitted by light modules such as the dipped-beam or high-beam module of the headlight).

In order to broaden the field of vision of the system, it is sometimes proposed to provide at least one additional image capturing device, which can capture an area laterally of the area of coverage of the already existing image capturing device(s), as a rule the forward facing image capturing device(s), so that e.g. in addition to the forward area of a motor vehicle, a lateral area of the vehicle can also be monitored/captured.

Admittedly the lateral area of a motor vehicle is not or not sufficiently well illuminated by the headlight or headlights of the vehicle, in particular the main light modules of the headlight such as the dipped-beam or high-beam module, so that the vision of the additional image capturing device(s) during the night is limited.

It is an object of the invention to propose a solution which will render the system cited in the beginning fully functional also at night.

With a system cited in the beginning this object is met in that according to the invention the system includes at least one optical additional image capturing device, which is arranged to capture a so-called additional area of coverage, and wherein the system further includes an additional lighting device which is arranged to at least partially, preferably completely, illuminate the additional area of coverage, also called the second area of coverage.

This allows a lateral area to be reliably captured by the additional image capturing device even at night or in bad visibility conditions.

Provision may for example be made for the image capturing device to be oriented in a first direction of coverage, and for the additional image capturing device to be oriented in a second direction of coverage, and wherein the first direction of coverage and the second direction of coverage, in horizontal direction, are arranged at an angle $\alpha$ to each other, wherein $\alpha \neq 0$.

An angle "in horizontal direction" is understood to mean that angle, which two vertical planes occupy in relation to each other, each of which contains a different direction of coverage (e.g. one vertical plane contains the first direction of coverage, the other vertical plane contains the second direction of coverage).

Each image capturing device comprises a certain angle of coverage, e.g. in horizontal and/or in vertical direction. For the capturing devices this may be identical or different. The "direction of coverage" is understood to mean that direction, which halves the horizontal and/or vertical angle of coverage.

Preferably provision is made for the angle $\alpha$ to lie between 45° and 65°, wherein preferably $\alpha=55°$. This permits good coverage of a lateral area.

Provision may be made for the direction of coverage to extend approximately parallel to a motor vehicle longitudinal axis and for the second direction of coverage, viewed in forward direction, to extend away from the vehicle longitudinal axis.

Preferably the lighting device is part of a motor vehicle headlight, in particular of the motor vehicle. This results in a compact easy-to-install unit.

The image capturing device includes for example one or more cameras.

The additional image capturing device preferably includes one or more additional cameras.

Provision may be made for the lighting device to include a dipped-beam module for generating dipped-beam light distribution and/or a high-beam module for generating high-beam light distribution or a combined module for generating dipped-beam and high-beam light distribution.

Provision may be made for the first area of coverage and the second are of coverage
- not to overlap and not to touch each other, or
- to overlap each other in sections, or
- to at least touch each other in sections and possibly overlap each other in sections.

The system may include an, in particular non-optical, surroundings capturing device, wherein the surroundings capturing device comprises for example RADAR and/or LIDAR, and wherein the surroundings capturing device is arranged to capture a further so-called third area of coverage, and wherein the surroundings capturing device comprises a third direction of coverage, wherein preferably the third area of coverage overlaps at least partially with the first and/or second, preferably with the first and the second area of coverage respectively, or the third area of coverage does not overlap with any of the two areas of coverage.

The third direction of coverage viewed in horizontal direction preferably lies between the two other directions of coverage, or it is valid to say that the second and the third direction of coverage coincide with each other.

The system according to the invention, for example a vehicle headlight, may include/comprise an additional capturing device, for example a sensor module such as LIDAR/RADAR, with which data additional to the other (image)

capturing devices, e.g. complementary and/or redundant data, can be acquired. By means of so-called "sensor fusion", i.e. by combining/fusing the data of the capturing devices, it is possible to form an optimal picture/image of the captured surroundings.

Preferably provision is made for the additional lighting device to be a lighting device for generating a motor vehicle light distribution or part of a motor vehicle light distribution, or for the additional lighting device to be a light source, for example in the form of a lamp or an LED.

Depending on the type of additional image capturing device used the additional lighting device, in particular the light source, may be arranged for emitting light in the visible range, e.g. it may be designed as a white light source, or designed for emitting light in the infrared range.

Provision may for example be made for the additional lighting device to be arranged for generating cornering light distribution.

Furthermore provision may be made for an illuminated area of the additional lighting device, the so-called additional illuminated area,
- to lie below the HD-line for dipped-beam light, in order to avoid being blinded by e.g. oncoming traffic, or
- to lie below and above as well as preferably on the HD-line for dipped-beam light, so that it is possible to achieve optimal illumination and thus support for the additional image capturing device.

"Illuminated area" is understood to mean, as the name already implies, that area, e.g. in front of a motor vehicle, which is lit by the respective lighting device. With the lighting device for generating a motor vehicle light distribution or part of a motor vehicle light distribution, this illuminated area, the so-called main illuminated area, corresponds to e.g. a dipped-beam light distribution or a high-beam light distribution.

Preferably the additional image capturing device and the additional lighting device are synchronously operated such that the additional lighting device emits light only in time windows, in which the additional image capturing device captures images.

In general the lateral area need not be continuously illuminated; rather it is sufficient to illuminate this area only then, when the additional image capturing device captures the surroundings and/or when the light conditions necessitate its activation.

For example a coupling to the surroundings capturing device may be provided for, such that due to information from the surroundings capturing device the additional lighting device is activated. If for example the surroundings capturing device detects an obstruction in the lateral area, but the additional image capturing device does not detect this obstruction, the additional lighting device is activated.

It may be provided that the additional image capturing device is arranged for capturing visible light and/or IR radiation.

Further the invention relates to a motor vehicle headlight for a motor vehicle, in particular an autonomous or semi-autonomous motor vehicle, wherein the motor vehicle headlight includes such a system, wherein preferably the optical image capturing device is arranged in a lateral edge area of the headlight, and/or the optical additional image capturing device is/are arranged in a second edge area of the headlight.

Preferably provision is made for the headlight to include a cover pane, and wherein the optical image capturing device is arranged in such a way that the first direction of coverage extends orthogonally to an area of the cover pane opposite the optical image capturing device and/or the optical additional image capturing device is arranged in such a way that the second direction of coverage extends orthogonally to an area of the cover pane opposite the optical additional image capturing device.

The expression "direction of coverage orthogonal to an opposite area of the cover pane" is for example to be understood to mean that the direction of coverage/a line running in the direction of coverage, at its puncturing point through the cover pane, is orthogonal to a tangential plane, which is applied to the cover pane at this puncturing point.

Further the invention relates to a motor vehicle with one, preferably two headlights—a left-hand one and a right-hand one—as described above.

Preferably the motor vehicle includes a system as described above, wherein at least the lighting device is part of a motor vehicle headlight of the motor vehicle.

Furthermore at least the additional lighting device is preferably part of a motor vehicle headlight, in particular of that motor vehicle headlight, which includes the lighting device.

Figure 2:
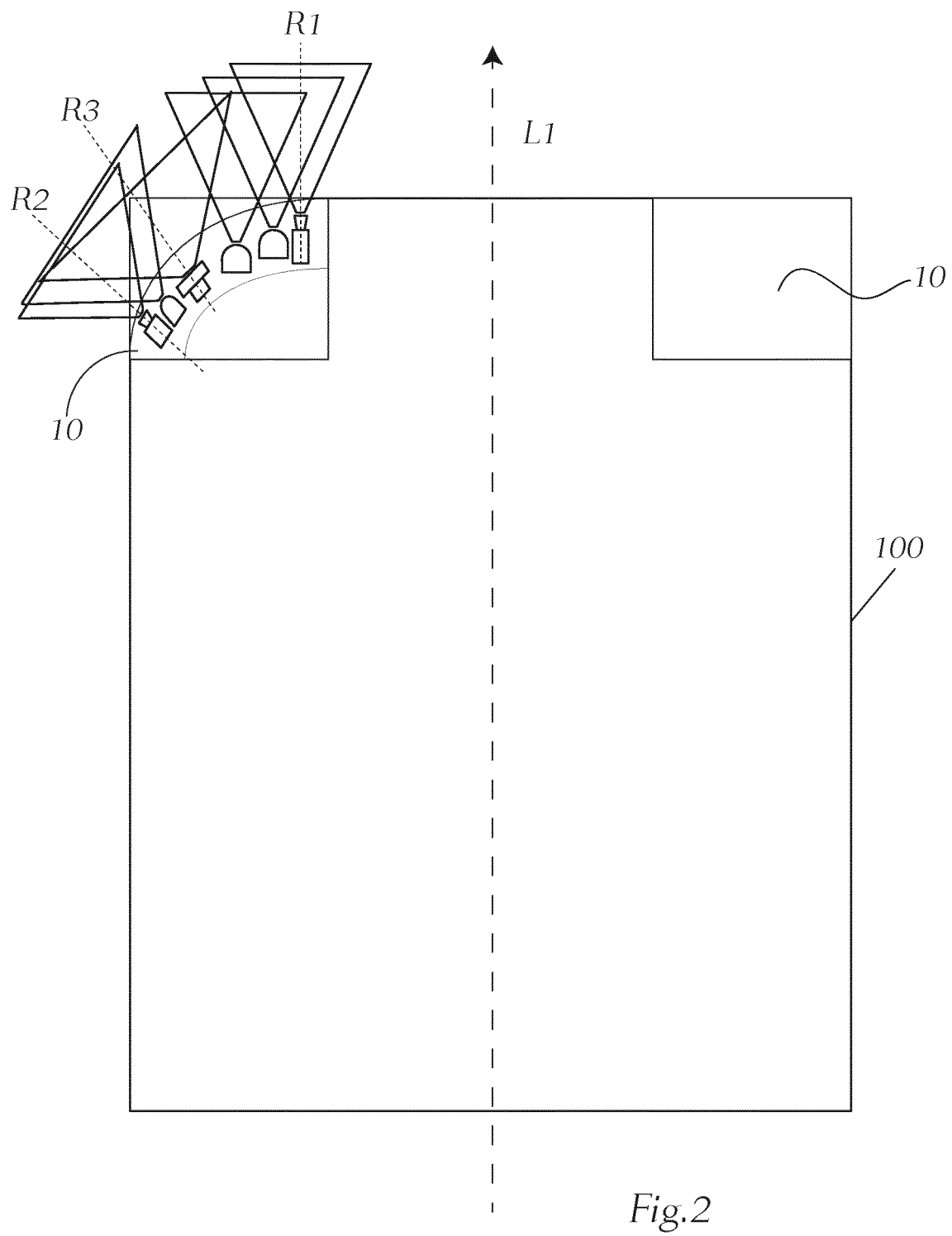

The invention will now be explained in more detail by way of the drawing, in which FIG. 1 shows a left-hand motor vehicle headlight of a motor vehicle and FIG. 2 shows a motor vehicle with two motor vehicle headlights.

FIG. 1 shows an inventive system 1, which is installed in a motor vehicle headlight 10 or forms such a motor vehicle headlight. The system 1 includes an optical image capturing device 2 in form of a camera 2 as well as a lighting device 3, 4. The lighting device in this example includes a dipped-beam light module 3 and a high-beam light module 4, which are arranged to generate dipped-beam/high-beam light distribution, by means of which the first illuminated areas A1, A2 ("main illuminated areas") are illuminated, when the respective module is activated.

The camera 2 is arranged to capture an area of coverage E1 of the surroundings, so that it can generate images of the surroundings covered. The area of coverage E1 is illuminated at least partially, as depicted, or preferably completely by the dipped-beam light module 3 and/or the high-beam light module 4.

According to the invention the system 1 includes an optical additional image capturing device 5, preferably in form of an additional camera 5, which is arranged to capture an additional area of coverage E2. In addition the system 1 further includes an additional lighting device 6, with an additional illuminated area A3, which is arranged to illuminate at least partially, preferably completely, the additional area of coverage E2, also called second area of coverage E2.

This allows a lateral area of the system 1, in particular of the motor vehicle headlight 10 (or the motor vehicle 100, see FIG. 2) to be reliably captured by the additional image capturing unit also at night or in poor visibility conditions.

The additional lighting device 6 may be a lighting device for generating a motor vehicle light distribution or a part of a motor vehicle light distribution; in the embodiment shown the additional lighting device 6 is a light source, such as in form of a lamp or a LED.

Depending on the type of additional image capturing unit used the additional lighting device 6, in this example the light source 6, emits light in the visible range (e.g. white light source) or it emits light in the infrared range.

The depicted system 1 also includes a non-optical surroundings capturing device 7, wherein this surroundings capturing device 7 includes for example RADAR and/or LIDAR, and is arranged to capture a further area, the so-called third area of coverage E3.

As will be recognised in FIG. 1, the image capturing device 2 is oriented in a first direction of coverage R1, and the additional image capturing device 5 is oriented in a second direction of coverage R2. The first direction of coverage R1 and the second direction of coverage R2, viewed in horizontal direction are arranged at an angle α to each other, wherein α≠0. Preferably it is provided that the angle α lies between 45° and 65°, wherein preferably α=55°. This permits good coverage of a lateral area.

As will be recognised in FIG. 2, which shows a motor vehicle 100, in which the system 1 is installed as the left-hand motor vehicle headlight 10 (preferably a correspondingly mirrored system 1 is also installed as the right-hand headlight 10), the direction of coverage R1 can extend approximately parallel to a motor vehicle longitudinal axis L1 with the second direction of coverage R2 extending away from the motor vehicle longitudinal axis L1, viewed in forward direction.

The surroundings capturing device 7 comprises a third direction of coverage R3, wherein preferably the third area of coverage E3 respectively overlaps as least partially with the first and/or second, preferably with the first and the second area of coverage E1, E2.

The surroundings capturing device 7 preferably lies between the two cameras 2, 5. The third direction of coverage R3—viewed in horizontal direction—preferably occupies an angle unequal zero to the first direction of coverage R1, and extends in forward direction away from a vehicle longitudinal axis L1. The angle between the third direction of coverage R3 and the first direction of coverage R1 is for example smaller than or equal to the angle α between the first and the second direction of coverage R1, R2.

As depicted the optical image capturing device 2 is preferably arranged in a lateral edge area of the headlight 10, preferably in that edge area, which faces the inside of the vehicle, and the optical additional image capturing device 5 is arranged in a second edge area, the edge area of the headlight located on the outside of the vehicle.

The invention claimed is:

1. A system (1) for monitoring the surroundings of a motor vehicle (100), the system (1) comprising:
   at least one optical image capturing device (2); and
   a lighting device (3, 4),
   wherein the at least one optical image capturing device (2) is arranged for capturing a first area of coverage (E1) of the surroundings, wherein the first area of coverage (E1) can be illuminated at least partially by the lighting device (3, 4), and wherein the lighting device (3, 4) is arranged for generating a motor vehicle light distribution or part of the motor vehicle light distribution,
   wherein the system (1) includes at least one optical additional image capturing device (5), which is arranged to capture a second area of coverage (E2), and wherein the system (1) further includes an additional lighting device (6), which is arranged to illuminate at least partially the second area of coverage (E2),
   wherein the system further comprises a non-optical surroundings capturing device (7), which (i) includes RADAR and/or LIDAR, (ii) comprises a third direction of coverage (R3) and (iii) is configured to capture a third area of coverage (E3), wherein the third area of coverage (E3) overlaps at least partially with the first and second areas of coverage (E1, E2),
   wherein the additional lighting device (6) is coupled to the surroundings capturing device (7),
   wherein the system detects an object using the surroundings capturing device (7),
   wherein the system determines that first data from the at least one optical additional image capturing device (5) does not indicate the object,
   wherein the system activates the additional lighting device (6) based on the surroundings capturing device (7) detecting the object and the first data from the at least one optical additional image capturing device (5) not indicating the object, and
   wherein the system determines that second data from the at least one optical additional image capturing device (5) indicates the object.

2. The system according to claim 1, wherein the image capturing device (2) is oriented in a first direction of coverage (R1), and the additional image capturing device (5) is oriented in a second direction of coverage (R2), and wherein the first direction of coverage (R1) and the second direction of coverage (R2), in horizontal direction, are arranged at an angle α to each other, wherein α≠0.

3. The system according to claim 2, wherein the direction of coverage (R1) extends approximately in parallel to a motor vehicle longitudinal axis (L1) and the second direction of coverage (R2) extends, viewed in forward direction, away from the vehicle longitudinal axis (L1).

4. The system according to claim 2, wherein the angle α lies between 45° and 65°.

5. The system according to claim 2, wherein the angle α is 55°.

6. The system according to claim 1, wherein the lighting device (3, 4) is part of a motor vehicle headlight (10).

7. The system according to claim 1, wherein the image capturing device (2) includes one or more cameras, and/or wherein the additional image capturing device (5) includes one or more additional cameras.

8. The system according to claim 1, wherein the lighting device (3, 4) includes a dipped-beam light module (3) for generating a dipped-beam light distribution and/or a high-beam light module (4) for generating a high-beam light distribution or a combined module for generating a dipped-beam and high-beam light distribution.

9. The system according to claim 1, wherein the first area of coverage (E1) and the second area of coverage (E2) do not overlap and do not touch each other, or overlap each other in sections, or touch each other at least in sections and optionally overlap each other in sections.

10. The system according to claim 1, wherein the additional lighting device (6) is a lighting device for generating a motor vehicle light distribution or a part of a motor vehicle light distribution, or the additional lighting device (6) is a light source in the form of a lamp or an LED.

11. The system according to claim 1, wherein the additional lighting device (6) is arranged for emitting light in the visible range or is designed for emitting light in the infrared range.

12. The system according to claim 11, wherein the additional lighting device (6) is configured as a white light source.

13. The system according to claim 1, wherein the additional lighting device (6) is arranged for generating a cornering light distribution.

14. The system according to claim 1, wherein an illuminated area (A3) of the additional lighting device (6) lies below an HD-line or lies below and above as well as on the HD-line.

15. The system according to claim 1, wherein the additional image capturing device (5) and the additional lighting device (6) are operated synchronously, such that the additional lighting device (6) emits light only in time windows, in which the additional image capturing device (5) captures images.

16. The system according to claim 1, wherein the additional image capturing device (5) is arranged for capturing visible light and/or for capturing IR radiation.

17. The system (1) of claim 1, wherein the area of coverage (E1) can be illuminated completely by the lighting device (3, 4) and/or wherein the additional lighting device (6) is arranged to completely illuminate the second area of coverage (E2).

18. The system according to claim 1, wherein the motor vehicle is an autonomous or semi-autonomous motor vehicle.

19. The system according to claim 1, wherein activation of the additional lighting device (6) causes a synchronous operation in time with respect to image capturing performed by the at least one optical image capturing device (2).

20. A motor vehicle headlight for a motor vehicle (100), wherein the motor vehicle headlight (10) comprises a system (1) according to claim 1.

21. The motor vehicle headlight according to claim 20, wherein the optical image capturing device (2) is arranged in a lateral edge area of the headlight (10), and/or the optical additional image capturing device (5) is/are arranged in a second edge area of the headlight.

22. The motor vehicle headlight according to claim 20, wherein the headlight includes a cover pane, and wherein the optical image capturing device (2) is arranged in such a way that a first direction of coverage (R1) in which the image capturing device (2) is oriented extends orthogonally to an area of the cover pane lying opposite to the image capturing device (2) and/or the optical additional image capturing device (5) is arranged in such a way that a second direction of coverage (R2) in which the additional image capturing device (5) is oriented extends orthogonally to an area of the cover pane lying opposite to the optical additional image capturing device (5).

23. A motor vehicle comprising at least one motor vehicle headlight of claim 20, wherein at least the lighting device (3, 4) is part of the motor vehicle headlight (10) of the motor vehicle (100), and/or wherein at least the additional lighting device (6) is part of the motor vehicle headlight (10), which comprises the lighting device (3, 4).

24. The motor vehicle headlight according to claim 20, wherein the motor vehicle is an autonomous or semi-autonomous motor vehicle.

* * * * *